United States Patent [19]

Castel et al.

[11] 4,308,243
[45] Dec. 29, 1981

[54] METHOD FOR TREATING RESIDUE GASES PROCEEDING FROM SULPHUR REMOVING UNITS AND PLANTS FOR CARRYING OUT THE SAID METHOD

[75] Inventors: Joëlle Castel, Le Port Marly; Christian Legrand, Rueil Malmaison, both of France

[73] Assignee: Compagnie Francaise d'Etudes et de Construction "TECHNIP", Paris, France

[21] Appl. No.: 123,004

[22] Filed: Feb. 20, 1980

[30] Foreign Application Priority Data

Feb. 23, 1979 [FR] France .............................. 79 04699

[51] Int. Cl.³ ............................................. B01D 53/34
[52] U.S. Cl. ..................................... 423/228; 423/220; 423/229
[58] Field of Search ............... 423/220, 223, 224, 226, 423/228, 229, 232, 233; 55/68, 73

[56] References Cited

U.S. PATENT DOCUMENTS

| | | | |
|---|---|---|---|
| 2,638,405 | 5/1953 | Frazier | 423/228 |
| 3,417,572 | 12/1968 | Pryor | 62/17 |
| 3,453,835 | 7/1969 | Hochgesand | 55/68 |
| 3,932,582 | 1/1976 | Eickmeyer | 423/223 |
| 4,160,810 | 7/1979 | Benson et al. | 423/223 |
| 4,198,378 | 4/1980 | Giammarco et al. | 423/223 X |

FOREIGN PATENT DOCUMENTS

1069689   5/1967   United Kingdom ................ 423/226

OTHER PUBLICATIONS

Chemical Abstracts, vol. 89, p. 132, 1978, Reference 131727c.

*Primary Examiner*—Earl C. Thomas
*Attorney, Agent, or Firm*—Kenyon & Kenyon

[57] ABSTRACT

This invention relates to a method for treating residue gases proceeding from units applying the Claus reaction for the removal of sulphur and having been subjected to a conversion of the sulphur compounds into sulphuretted hydrogen.

This method consists in that, prior to absorption of the sulphuretted hydrogen by a selective solvent in aqueous solution, the gases to be treated are cooled to a temperature so selected as to condense the water contained in the gases to form an aqueous effluent which is thereafter injected into the circuit of the selective solvent.

13 Claims, 4 Drawing Figures

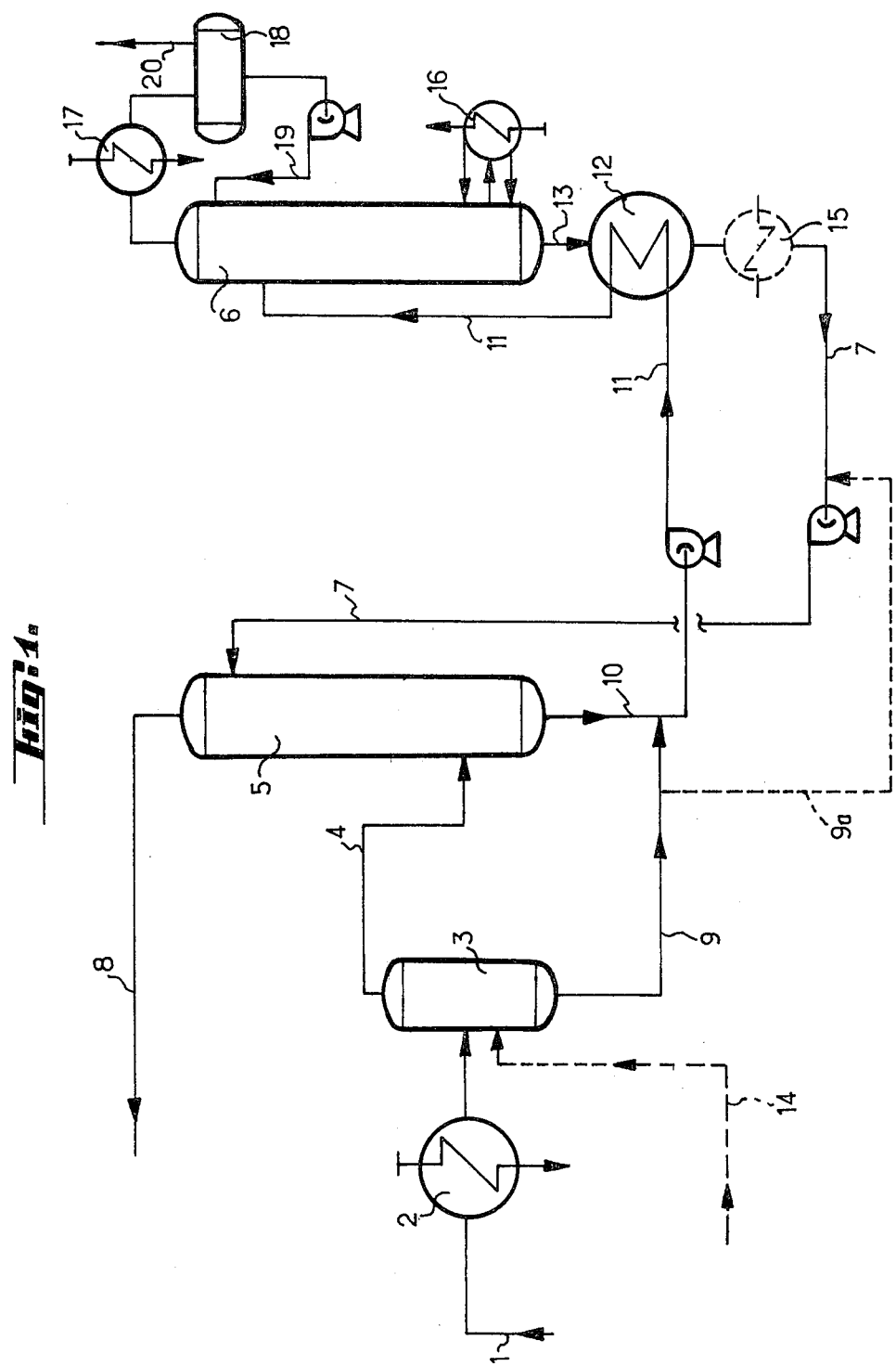

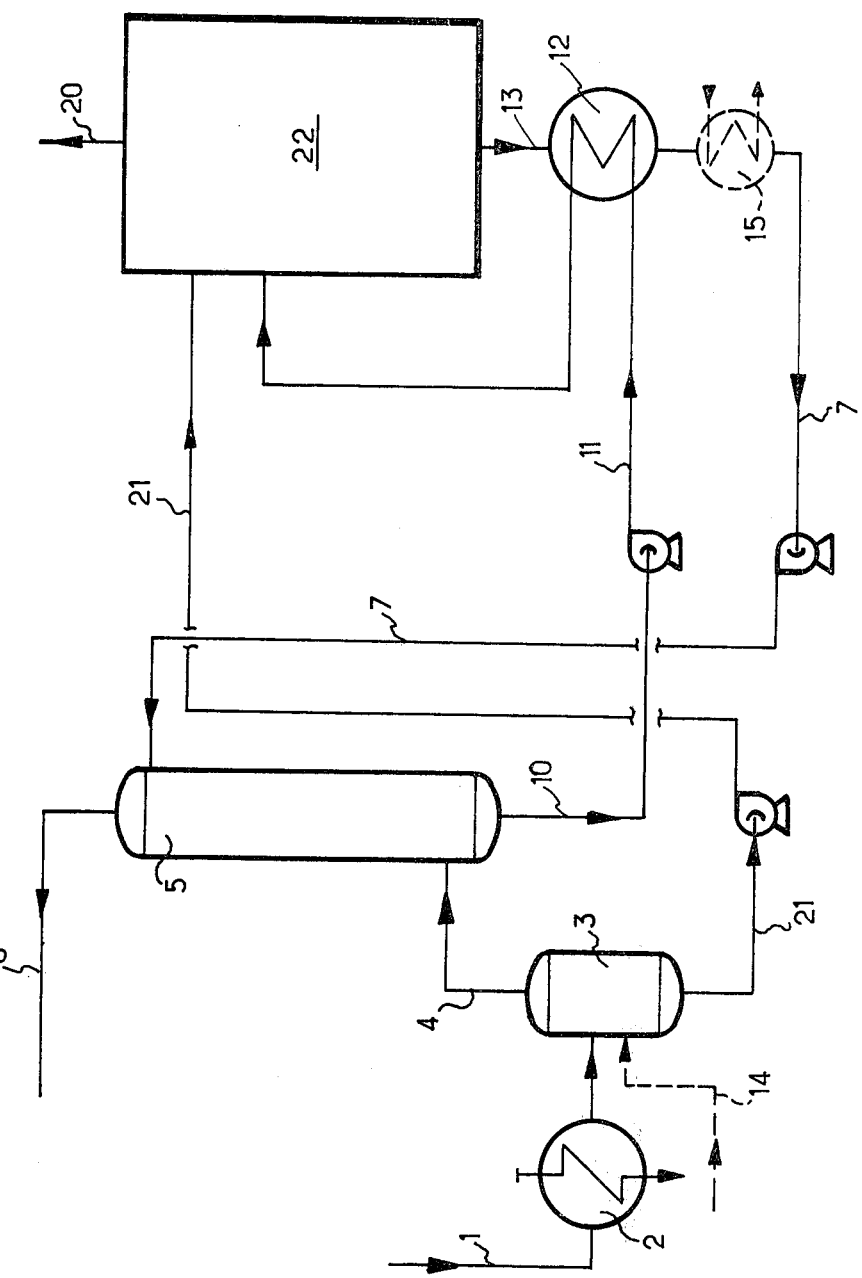

METHOD FOR TREATING RESIDUE GASES PROCEEDING FROM SULPHUR REMOVING UNITS AND PLANTS FOR CARRYING OUT THE SAID METHOD

The present invention has essentially for a subject matter a method for treating residue gases proceeding from units applying the Claus reaction for the removal of sulphur.

It is also directed to a plant for carrying out the said method.

Methods for complementary removal of sulphur or sulphur-containing compounds have already been proposed which consist generally of converting sulphur-containing compounds such as sulphur dioxide, carbon disulphide, etc., into hydrogen sulphide ($H_2S$) and thereafter effecting an absorption of the hydrogen sulphide by means of a solvent in aqueous solution.

More precisely, it is known to treat effluent residue gases from sulphur producing units by effecting a catalytic hydrogenation followed by a washing by means of a selective solvent in aqueous solution, i.e., a solvent that absorbs sulphuretted hydrogen in preference to carbon dioxide. According to this method, the solvent and cold gases are injected into an absorption tower, thus favoring preferential absorption of hydrogen sulphide and therefore avoiding, for example, both high consumption of steam for regenerating the solvent and great expenditure of electric energy for its circulation in the plant.

In such a method, however, the refrigeration of the gas leads to the condensation of a not inconsiderable amount of water saturated with hydrogen sulphide and constituting a polluting reject which may be considerable in the case of sulphur removing units of high capacity.

The present invention remedies in particular this drawback by providing a method and a plant avoiding any polluted water reject, thus complying with present-day antipollution standards while at the same time allowing the absorption tower to be operated at a moderate temperature.

To this end, the invention has for a subject matter a method of treating gases containing sulphuretted hydrogen, such as, for example, residue gases proceeding from units applying the Claus reaction for sulphur removal, and having undergone a conversion of the sulphur containing compounds into hydrogen sulphide of the type consisting of effecting an absorption of the hydrogen sulphide by means of a selective solvent in aqueous solution and of regenerating the said solvent which is thereafter recycled to absorption, characterized in that after the said absorption the gases to be treated are cooled to a temperature so selected as to condense the water contained in the said gases to form an aqueous effluent which is thereafter injected into the circuit of the said selective solvent.

According to another characterizing feature of this method, the gas separated from the aqueous effluent is subjected to absorption by the solvent while being at a lower temperature than that of the solvent.

According to still another characterizing feature, the temperature of injection of the solvent recycled to absorption is such that the water of the solvent that is given up to the gas is limited or controlled so as to obtain in the sulphur recovery plant an overall water balance that balances without liquid water rejection.

Otherwise stated, part of the water of the solvent admitted to absorption is controllably evaporated in contact with the gas separated from the aqueous effluent.

It should be noted here that this aqueous effluent may, if appropriate, be completed with other aqueous effluents without unbalancing the overall water balance in the plant while at the same time avoiding liquid water rejection.

According to another characterizing feature of the method of the invention, the aqueous effluent is admitted into the $H_2S$-rich stream of solvent passing from absorption to regeneration, or into the $H_2S$-lean stream of solvent passing from regeneration to absorption.

According to another form of embodiment of the invention, the said aqueous effluent is injected into the condensation system associated with the regeneration.

The aqueous effluent may also, without departing from the scope of the invention, be injected into the regeneration column.

In this case, the aqueous effluent may be admitted during a water reflux into the regeneration column.

According to another characterizing feature, the acidic gas issuing from the regeneration column is cooled in the top of the said column by countercurrent heat-exchange with water drawn off from the column and which, after being refrigerated, is injected above the level at which the said water is drawn off.

According to another characterizing feature of the method of the invention, the aqueous effluent may be mixed with the injected water before or after its refrigeration.

According to still another characterizing feature, a predetermined quantity of the water drawn off from the regeneration column is reinjected below the aforesaid draw-off level.

It should also be noted that the aqueous effluent is comprised in the aforesaid predetermined quantity of water.

The invention is also directed to a plant for carrying out the method characterized by the aforesaid features, the said plant being essentially characterized in that it comprises a device for refrigerating the gases to be treated and, if appropriate, a device for separating the said gases from the aqueous effluent upstream of the absorption tower, the gas outlet of the said separating device being connected to the absorption tower and its aqueous effluent outlet being connected to the solvent circuit.

Other characterizing features and advantages of the invention will appear more clearly from the following detailed description with reference to the appended drawings given solely by way of example and wherein:

FIG. 1 is a diagrammatic view of a residue gas treating plant according to the invention, in which the aqueous effluent is introduced into the $H_2S$-rich or $H_2S$-lean solvent;

FIG. 2 is a diagrammatic view illustrating another form of embodiment of the invention, in which the aqueous effluent is injected into the condensation system associated with the regeneration column;

Figure 4:
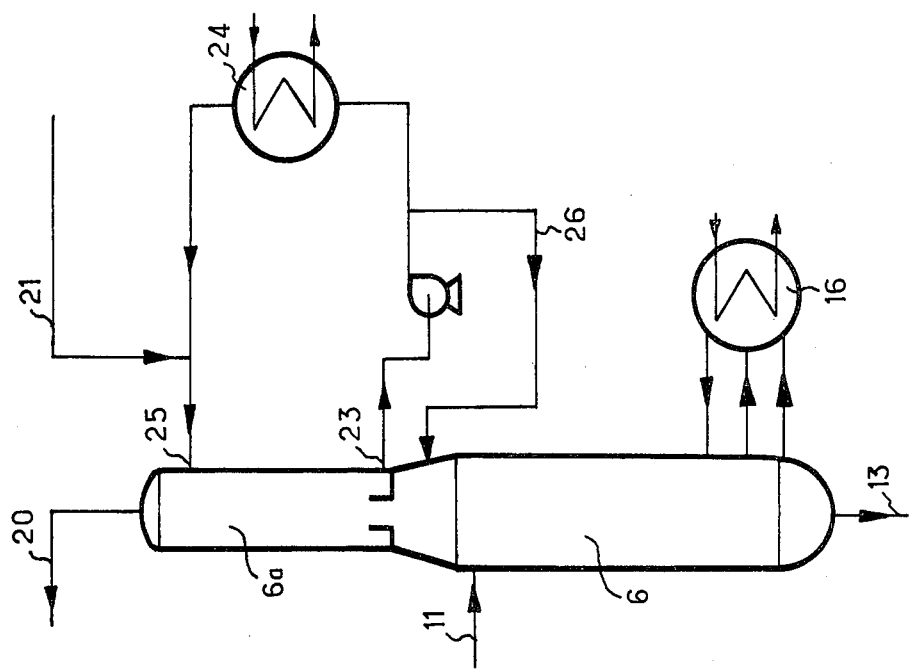
FIG. 4 is a second form of embodiment of the condensation system, usable in the plant of FIG. 2.

Referring to FIG. 1, there is seen at 1 a line through which the gases to be treated, after being subjected to hydrogenation, enter the plant. The entering gases are cooled in a refrigeration device 2 and, in accordance with the invention, enter a separating device or drum 3. The separated gases are introduced through a line 4 into the bottom of an absorption column 5, where they come into contact with the stream of regenerated, hydrogen sulphide-lean solvent proceeding from a regeneration column 6 and passing through a line 7.

More precisely, the solvent, which is for example a selective amine such as methyldiethanolamine, after being regenerated, enters the top of the absorption column 5, and the injection temperature of the solvent, which may be of the order of, for example, 70° C., is so adjusted that the treated gases leaving the said column through the conduit 8 and subsequently incinerated contains a controlled quantity of steam water in order to balance the overall water balance without there being any rejection of liquid. The water of the regenerated solvent entering through the line 7 is controllably vaporized in the absorption column 5 by coming into contact with the gas entering through the line 4 and which is at a lower temperature than that of the solvent, e.g., of the order of 50° C.

The aqueous effluent resulting from the condensed water during the refrigeration of the gases to be treated leaves the separating tank 3 through a line 9 and is injected into a pipe 10 through which passes the hydrogen sulphide-rich solvent leaving the absorption column 5. The mixture of rich solvent and aqueous effluent is conveyed through the line 11 into the regeneration column 6 after passing through an exchanger 12 in which an exchange takes place with the regenerated solvent leaving the bottom of the column 6 through a pipe 13.

Instead of being introduced into the rich solvent circuit, the aqueous effluent may as well, without departing from the scope of the invention, be introduced into the hydrogen sulphide-lean solvent circuit as shown at 9a in FIG. 1.

The aforesaid aqueous effluent may, if appropriate, be completed with other aqueous effluents entering the separator 3 through a line 14, without however unbalancing the water balance in the plant.

In some cases, in accordance with an alternative which is not illustrated in the Figures, it is possible to dispense with the separator 3 and to introduce the aqueous effluent after a heat exchange at 2, and/or the complementary effluent 14, if any, directly into the absorption column 5.

At 15 is shown an exchanger which may be provided for cooling the regenerated solvent, in case such an exchanger is necessary for obtaining the desired injection temperature of the selective solvent into the absorption column 5. In this respect, the temperature of injection of the gases to be treated in column 5 may be so selected as to ensure the condensation of sufficient water to cause the temperature differential between the top and the bottom of the said column to be sufficiently high to dispense with the aforesaid complementary refrigeration.

As known per se, a reboiler 16 is associated with the regeneration column 6. It should be noted, however, that owing to the method of the invention, the thermal load or heat input to be supplied to the reboiler can advantageously be reduced.

The condensation system associated with the regeneration column 6 may be for example of the conventional type comprising, as seen clearly in FIG. 1, a condensor 17 and a drum 18 for the reflux of the water which is recycled through a pipe 19 to the top of column 6, whereas a pipe 20 associated with the drum 18 discharges the acidic gas which is recycled to a sulphur removing unit. Use can also be made of a condensation system of the circulating reflux type as will be described in more detail later.

The system just described therefore allows a concentration of the solvent in the absorption column 5 where the solvent gives up to the treated gas a certain quantity of water which is vaporized and is so limited as to preserve the water balance in the plant.

Reference is now made to the diagram of FIG. 2 illustrating another form of embodiment of the plant according to the invention, in which the same reference numerals as in FIG. 1 are used for the elements common to both Figures.

As in FIG. 1, the gases to be treated, after being refrigerated at 2, are conveyed through the line 4 into the bottom of the absorption column 5 in which they come into contact with the solution of selective solvent 7 injected into the top of the column, the injection temperature being so adjusted that the gas treated at the top of the column contains a controlled quantity of steam ensuring a balanced water balance in the sulphur recovery system without rejection of liquid.

Figure 3:
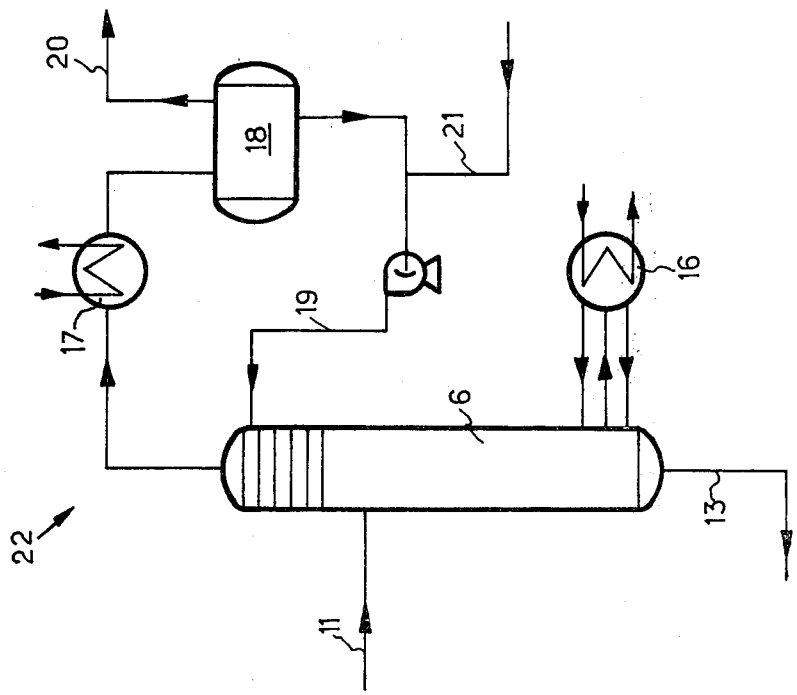
FIG. 3 is a diagrammatic view of a first form of embodiment of the condensation system, usable in the plant of FIG. 2.

In this form of embodiment, however, the aqueous effluent leaving the separating drum 3 is not injected into the pipe 10 for the hydrogen sulphide-rich solvent, but is introduced through a line 21 into the condensation system associated with the regeneration portion denoted generally by the reference numeral 22 in FIG. 2, and which may be of the two types illustrated in FIGS. 3 and 4, respectively. Line 20 in FIG. 2 corresponds to pipe 20 of FIG. 1 and line 20 of each of FIGS. 3 and 4.

As appears clearly from FIG. 3, the aqueous effluent passing through the pipe 21, as well, besides, as the other aqueous effluents, if any, proceeding from other units, is introduced into the pipe 19 ensuring a reflux of the water proceeding from the drum 18 and entering the top of the regeneration column 6. In case this column, as seen in FIG. 3, is provided in its upper portion with a few heat exchange plates or trays, the injected water is heated by coming into contact with the ascending hot vapors, thus allowing the thermal load of both the condensor 17 and the reboiler 16 to be reduced. As mentioned in connection with FIG. 1, the acidic gas flowing out through the line 20 is recycled to the sulphur producing unit.

The condensation system represented in FIG. 4 is of the circulating reflux type. The acidic gas leaving the regeneration column 6 and recycled to the sulphur producing plant through the line 20 is cooled in the upper portion 6a of column 6 by countercurrent heat exchange with water drawn off from the said column at 23 and which is injected, after being refrigerated at 24, much above the draw-off level 23, as shown at 25. The aqueous effluent entering through the line 21 is mixed with the water injected after being refrigerated.

As seen clearly in FIG. 4, a pipe 26 allows the reinjection to the column and before refrigeration, of a predetermined quantity of the water drawn off from the column at 23. This water of course includes the aqueous effluent and is reintroduced in the hot state into the upper portion of column 6, below the draw-off level 23.

Thus, this system allows the thermal load of the condensor to be advantageously reduced due to the heating of the aqueous effluent entering the upper portion 6a of the column, which also results in reducing the thermal load of the reboiler 16 and therefore the energy consumption of the sulphur removing unit.

Referring again to FIGS. 1 and 2, stress should again be laid on the fact that the temperature differential between the regenerated solvent entering the absorption column 5 and the rich solvent leaving the bottom of this column is essentially determined by the quantity of water vaporized in the said column. This is essentially due to the fact that the calorific capacity of the gases to be treated is low and that also the heat of reaction released by the absorption of the acidic gas is low compared with the heat of vaporization of the water. This result is the more ensured as the solvent is more selective in absorbing hydrogen sulphide in preference to carbon dioxide.

When the refrigerating means used allows the gas to be treated to be cooled to a temperature sufficiently lower than its water dew point, the complementary lean-solvent refrigerant 15 may advantageously be dispensed with. To this end, the temperature of cooling of the gas to be treated must be adjusted to a value corresponding to the economic minimum temperature differential (e.g., between 5° and 20° C.) between the solvent-rich bottoms of the absorption column and the lean solvent entering it, which allows the lean solvent leaving the regeneration column 6 to be cooled to the desired temperature for its injection into the absorption column 5 by simple exchange with the rich solvent.

If the temperature differential between the rich solvent and the lean solvent is too small to allow the lean-solvent injection temperature to be reached in the exchanger 12 alone (e.g., when the refrigerating means 2 do not allow an economically advantageous, sufficiently substantial cooling of the gas to be treated), the refrigeration of the gas to be treated is effected to the economically feasible minimum temperature, thus reducing the thermal load of the complementary solvent refrigerant.

There are thus obtained, according to the invention, a method and a plant for treating residue gases proceeding from sulphur removing units, which are particularly advantageous from the standpoint of economy and avoid any rejection of pollutant liquid water saturated with hydrogen sulphide.

Of course, the invention is by no means limited to the forms of embodiment described and illustrated which have been given by way of example only. In particular, it comprises all means constituting technical equivalents to the means described as well as their combinations should the latter be carried out according to its gist within the scope of the following claims.

What is claimed is:

1. In a method for treating gases containing hydrogen sulphide, comprising the steps of effecting an absorption of hydrogen sulphide with a selective solvent in aqueous solution and of regenerating the said solvent before recycling it to said absorption, the improvement of cooling the gases to be treated prior to said absorption so as to condense the water contained in said gases, separating said gases from the condensed water and to form an aqueous effluent, injecting said aqueous effluent into said selective solvent at a point separate from said absorption step in order that at least a portion of the water of the solvent admitted to absorption can be controllably evaporated and carried along with said gases during absorption so as to avoid any rejection of liquid water after absorption.

2. A method according to claim 1, wherein the gas separated from said aqueous effluent is subjected to absorption by the solvent while being at a controlled temperature lower than that of said solvent, whereas the temperature of injection of said solvent is such that the water of the solvent given up to the said gas is limited or controlled so as to obtain a balanced overall water balance without rejection of liquid water.

3. A method according to claim 1, wherein said aqueous effluent is admixed with another aqueous effluent.

4. A method according to claim 1, wherein the stream of solvent passing from absorption to regeneration consists of a hydrogen sulphide-rich solvent, the stream of solvent in the opposite direction consists of hydrogen sulphide-lean solvent, and the said aqueous effluent is introduced into either the stream of rich solvent or the stream of lean solvent.

5. A method according to claim 1, wherein the solvent is regenerated in a column with an associated condensation system, and the said aqueous effluent is injected into the said condensation system.

6. A method according to claim 1, wherein the said aqueous effluent is injected into the regeneration column.

7. A method according to claim 5, wherein the aqueous effluent is introduced during a water reflux into the regeneration column.

8. A method according to claim 5, wherein the acidic gas issuing from the regeneration column is cooled in the top of the said column by countercurrent heat-exchange with water drawn off from the column and which, after being refrigerated, is injected above the level at which the said water is drawn off.

9. A method according to claim 8, wherein the aqueous effluent is mixed with the water injected prior or subsequent to its refrigeration.

10. A method according to claim 8, wherein a predetermined quantity of the water drawn off from the regeneration column is reinjected below the aforesaid draw-off level.

11. A method according to claim 10, wherein the aqueous effluent is included in the said predetermined quantity of water.

12. A method according to claim 1, wherein said solvent is an aqueous solution of a selective amine.

13. A method according to claim 12 wherein said amine is methyldiethanolamine.

* * * * *